(12) United States Patent
Okamura et al.

(10) Patent No.: US 9,643,602 B2
(45) Date of Patent: May 9, 2017

(54) PARKING SUPPORT DEVICE

(71) Applicant: TOYOTA JIDOSHA KABUSHIKI KAISHA, Toyota-shi, Aichi (JP)

(72) Inventors: Ryuji Okamura, Gotenba (JP); Atsushi Sagisaka, Shizuoka (JP); Shinya Sannodo, Susono (JP); Yu Hiei, Susono (JP); Kotaro Saiki, Susono (JP); Keisuke Hata, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/732,875

(22) Filed: Jun. 8, 2015

(65) Prior Publication Data
US 2015/0375740 A1 Dec. 31, 2015

(30) Foreign Application Priority Data
Jun. 25, 2014 (JP) ................................. 2014-130274

(51) Int. Cl.
*B60W 30/06* (2006.01)
*B62D 15/02* (2006.01)

(52) U.S. Cl.
CPC ......... *B60W 30/06* (2013.01); *B62D 15/0285* (2013.01); *B60W 2550/10* (2013.01); *B60W 2600/00* (2013.01)

(58) Field of Classification Search
CPC ............. B60W 30/06; B60W 2550/10; B60W 2600/00; B62D 15/0285
See application file for complete search history.

(56) References Cited

U.S. PATENT DOCUMENTS

| 5,742,141 | A | * | 4/1998 | Czekaj | ............... B62D 15/0285 180/167 |
| 2003/0004613 | A1 | * | 1/2003 | Hahn | ................. B62D 15/0285 701/1 |
| 2005/0131587 | A1 | * | 6/2005 | Takamatsu | ............ B60W 10/06 701/1 |

(Continued)

FOREIGN PATENT DOCUMENTS

| JP | 2005-250564 A | 9/2005 |
| JP | 2007-22498 A | 2/2007 |
| JP | 2014-8939 A | 1/2014 |

*Primary Examiner* — Stephen Holwerda
(74) *Attorney, Agent, or Firm* — Sughrue Mion, PLLC (57) ABSTRACT

A parking support device 1 includes a calculation unit 17 that calculates a speed pattern, an acceleration recognition unit 13 that recognizes driver-requested acceleration, a parking support control unit 19 that performs parking support control in a target parking position based on the speed pattern, and a determination unit 18 that determines whether a host vehicle V can stop in the target parking position at a set deceleration. When the driver-requested acceleration is recognized during the control and exceeds acceleration of the speed pattern at the time of recognition, the parking support control unit 19 accelerates the host vehicle V at the driver-requested acceleration. When the determination unit 18 determines that the host vehicle V can stop in the target parking position at the set deceleration, the host vehicle V is decelerated at the set deceleration and is stopped in the target parking position regardless of the driver-requested acceleration.

2 Claims, 7 Drawing Sheets

(56) References Cited

U.S. PATENT DOCUMENTS

| | | | | |
|---|---|---|---|---|
| 2005/0264432 A1* | 12/2005 | Tanaka | ............... | B60Q 9/004 340/932.2 |
| 2007/0051547 A1* | 3/2007 | Fischer | ............. | B60K 31/0075 180/204 |
| 2009/0123028 A1* | 5/2009 | Satonaka | .......... | B62D 15/0285 382/103 |
| 2014/0121930 A1 | 5/2014 | Allexi et al. | | |

* cited by examiner

PARKING SUPPORT DEVICE

BACKGROUND OF THE INVENTION

Field of the Invention

An aspect of the present invention relates to a parking support device.

Related Background Art

A device disclosed in, for example, Japanese Unexamined Patent Application Publication No 2014-008939 below is known as a parking support device. The parking support device which is disclosed in Japanese Unexamined Patent Application Publication No 2014-008939 includes a steering angle sensor that detects a steering angle, a speed detection unit that detects speed of a vehicle, a trajectory control unit that sets a steering angle command and a speed command, an automatic steering control device that performs automatic steering such that the detected steering angle is in line with the steering angle command, and an automatic speed control device that automatically controls the speed such that the detected speed is in line with the speed command. The parking support device causes a host vehicle to park in a target parking position through the automatic steering control and the automatic speed control. In the parking support device, constant speed is maintained by causing the speed command to be constant in the automatic speed control, and thus the accuracy of the steering angle is maintained in the automatic steering control.

SUMMARY

As described above, in the parking support device, the parking support control is performed such that the traveling speed of a vehicle is constantly maintained. Therefore, for example, when a driver feels that a control time until parking is completed is slow, it is difficult to accelerate the vehicle along with the intention of the driver. As a result, there is a possibility that the control time cannot be reduced.

An object of an aspect of the present invention is to provide a parking support device which can reduce a control time until parking is completed.

According to an aspect of the present invention, there is provided a parking support device including: a calculation unit configured to calculate a speed pattern which causes a vehicle to travel along a traveling route from a current position of the vehicle to a target parking position; an acceleration recognition unit configured to recognize a driver-requested acceleration with regard to the vehicle based on an accelerator operation performed by the driver of the vehicle; and a control unit configured to control parking support in the target parking position based on the speed pattern and the traveling route. The control unit is configured to accelerate the vehicle at the requested acceleration when the driver-requested acceleration is recognized by the acceleration recognition unit during the control of the parking support and the requested acceleration exceeds acceleration of the speed pattern at the time of the recognition, and decelerate the vehicle at a set deceleration and stop the vehicle in the target parking position regardless of the requested acceleration when it is determined that the vehicle can stop in the target parking position at the set deceleration which is set in advance, based on a traveling speed and a position of the vehicle.

The parking support device according to the aspect of the present invention may further include an obstacle detection unit configured to detect a position of an obstacle which is present in a vicinity of the vehicle. The traveling route may be include a wheel-turning traveling route from the current position of the vehicle to a wheel-turning position which is determined by clearance with the obstacle detected by the obstacle detection unit, the calculation unit may be configured to calculate a wheel-turning speed pattern which causes the vehicle to travel along the wheel-turning traveling route, as a part of the speed pattern, and the control unit may be configured to accelerate the vehicle at the requested acceleration when the driver-requested acceleration is recognized by the acceleration recognition unit during the control of the parking support and the requested acceleration exceeds the acceleration of the wheel-turning speed pattern at the time of the recognition, and decelerate the vehicle at a set wheel-turning deceleration and stop the vehicle in the wheel-turning position regardless of the requested acceleration when it is determined that the vehicle can stop in the wheel-turning position at the set wheel-turning deceleration which is set in advance, based on the traveling speed and the position of the vehicle.

According to the aspect of the present invention, it is possible to provide a parking support device which can reduce a control time until parking is completed.

DESCRIPTION OF THE PREFERRED EMBODIMENTS

Hereinafter, an embodiment of the present invention will be described in detail with reference to the accompanying drawings. Meanwhile, in the description below, the same reference numerals are attached to the same or equivalent components and the description thereof will not be repeated.

Figure 1:
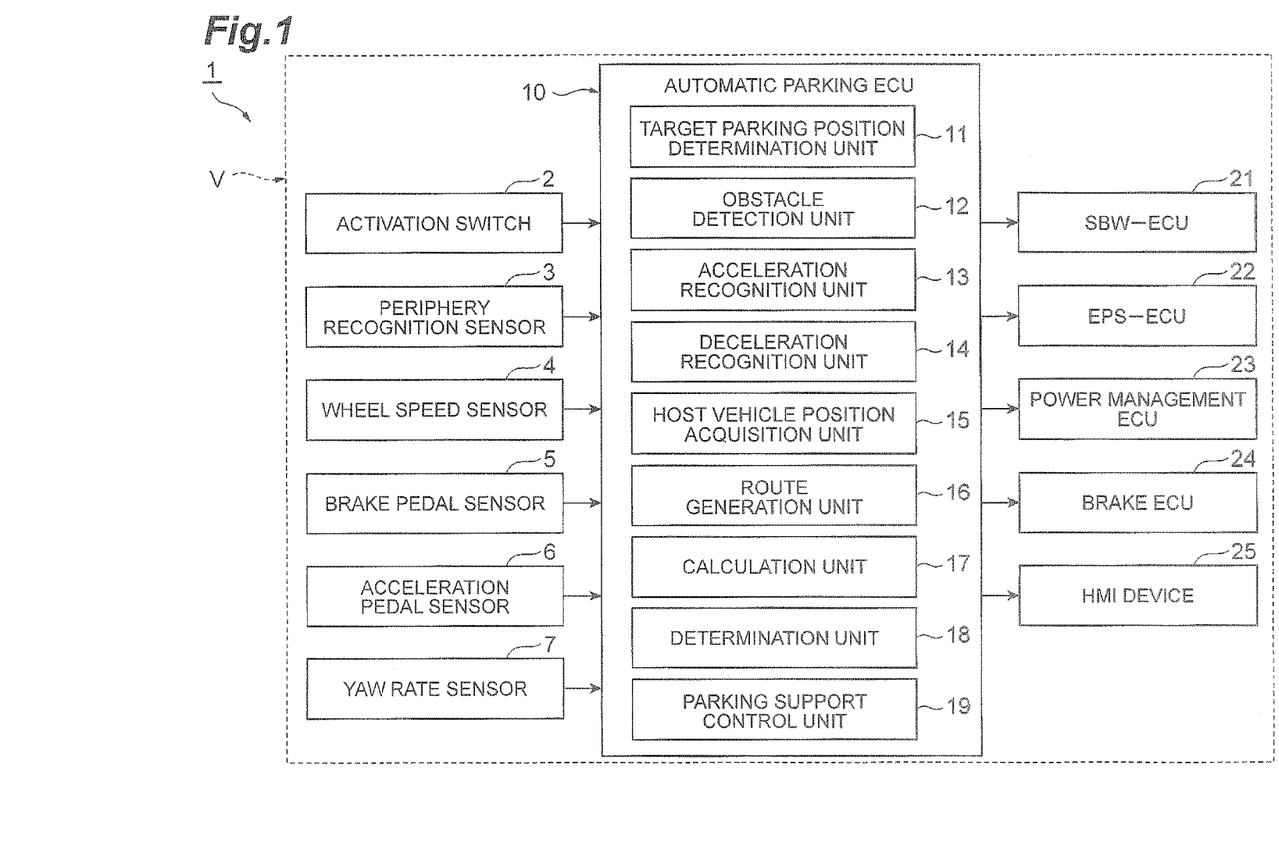
FIG. 1 is a block diagram illustrating the configuration of a parking support device according to an embodiment.
Figure 2:
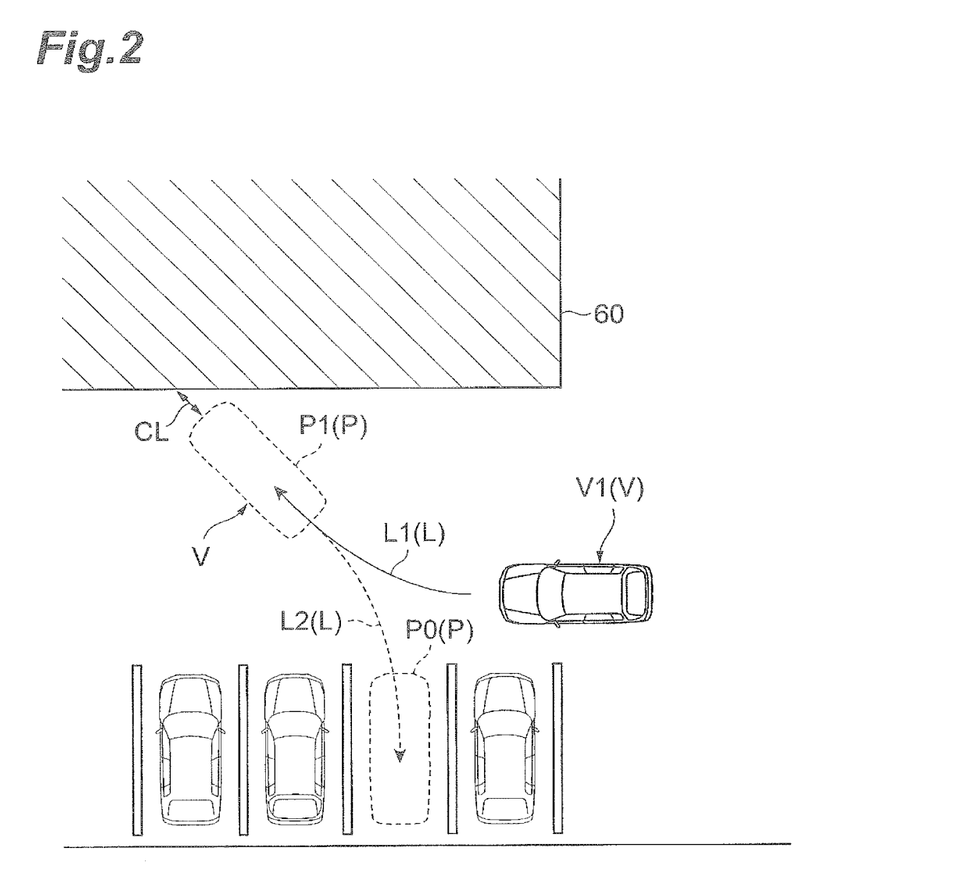
FIG. 2 is a bird's-eye view illustrating an example of parking support control performed by the parking support device of FIG. 1.

FIG. 1 is a block diagram illustrating the configuration of a parking support device according to an embodiment. FIG. 2 is a bird's-eye view illustrating an example of parking support control performed by the parking support device of FIG. 1. FIG. 2 illustrates an example of the parking support control in which wheels are turned once when the vehicle moves backward to park.

As illustrated in FIG. 1, a parking support device 1 generates a traveling route from a current position of the host vehicle V, such as a passenger car, to a target parking position, and supports parking to the target parking position of the vehicle along the traveling route. The parking support device 1 according to the embodiment is mounted on, for example, the host vehicle V, and causes the host vehicle V to be automatically parked by automatically controlling the braking force, the driving force, and the steering of the host vehicle V. As illustrated in FIG. 2, a target parking position P0 is the position of a parking space, at which the host vehicle V is parked, for example, in a parking lot, and is a target position at which the host vehicle V is parked.

As illustrated in FIG. 1, the parking support device 1 includes an activation switch 2, a periphery recognition sensor 3, a wheel speed sensor 4, a brake pedal sensor 5, an acceleration pedal sensor 6, a yaw rate sensor 7, and an automatic parking Electronic Control Unit (ECU) 10.

The activation switch 2 is a switch for starting or terminating control of parking support to the target parking position P0 (hereinafter, referred to as "parking support control") in the parking support device 1. The activation switch 2 is connected to the automatic parking ECU 10. The activation switch 2 outputs an ON/OFF state, which is operated by a driver of the host vehicle V (hereinafter, simply referred to as "driver"), to the automatic parking ECU 10 as a switch signal. It is possible to use, for example, a hardware switch, which can be operated by being pressed by the driver, or a software switch, which is displayed on an on-vehicle display, as the activation switch 2.

The periphery recognition sensor 3 detects and recognizes the peripheral environment of the host vehicle V. It is possible to use, for example, a radar sensor, a clearance sonar sensor, an image sensor using a camera, or the like as the periphery recognition sensor 3. For example, when the radar sensor is used, it is possible to use a method of grasping the three-dimensional shape of a peripheral object by detecting the reflected light of laser beams. When the sonar sensor is used, it is possible to use a method of detecting the reflection of sound waves. When the camera is used, it is possible to use a mobile stereo method of detecting the three-dimensional object of a peripheral object by grasping the correspondence relationship of images between different frames.

The peripheral environment, which is recognized by the periphery recognition sensor 3, includes, for example, information relevant to an obstacle which is a peripheral obstacle of the host vehicle V, and information relevant to a peripheral parking space of the host vehicle V. The obstacle means, for example, an object, which is a hindrance to parking, such as another parking vehicle or a wall. Each piece of information in the peripheral environment may include the position, coordinates, size of the object, the distance between the object and the host vehicle V, and the like. The periphery recognition sensor 3 may use, for example, a Global Positioning System (GPS) device or a navigation device.

The wheel speed sensor 4 detects the traveling speed of the host vehicle V by detecting the rotation speeds of the wheels of the host vehicle V. The brake pedal sensor 5 is provided on, for example, the brake pedal of the host vehicle V. The brake pedal sensor 5 detects the existence/non-existence of a brake operation, which is the operation of the brake pedal performed by the driver of the host vehicle V, and the amount of the operation. The acceleration pedal sensor 6 is provided on, for example, the acceleration pedal of the host vehicle V. The acceleration pedal sensor 6 detects the existence/non-existence of an accelerator operation, which is the operation of an acceleration pedal performed by the driver of the host vehicle V, and the amount of the operation. The yaw rate sensor 7 detects the yaw rate of the host vehicle V. Each of the sensors 3 to 7 detects each piece of information of the host vehicle V at every fixed time, and transmits a detected signal indicative of each piece of information to the automatic parking ECU 10. Meanwhile, the sensors 3 to 7 are not particularly limited, and it is possible to use various sensors if it is possible to realize the functions thereof.

The automatic parking ECU 10 is an electronic control unit which integrally controls the parking support device 1. The automatic parking ECU 10 performs the parking support control of the host vehicle V by causing the host vehicle V to automatically travel and causing the host vehicle V to be automatically parked in the target parking position P0. The automatic parking ECU 10 includes a target parking position determination unit 11, an obstacle detection unit 12, an acceleration recognition unit 13, a deceleration recognition unit 14, a host vehicle position acquisition unit 15, a route generation unit 16, a calculation unit 17, a determination unit 18, and a parking support control unit 19 as functional components.

The automatic parking ECU 10 loads an application program, which is stored in a Read Only Memory (ROM), into a Random Access Memory (RAM), and a Central Processing Unit (CPU) executes the application program. Therefore, the automatic parking ECU 10 realizes the respective functions of the target parking position determination unit 11, the obstacle detection unit 12, the acceleration recognition unit 13, the deceleration recognition unit 14, the host vehicle position acquisition unit 15, the route generation unit 16, the calculation unit 17, the determination unit 18, and the parking support control unit 19. A Shift By Wire (SBW)-ECU 21, an Electric Power Steering (EPS)-ECU 22, a power management ECU 23, a brake ECU 24, and an HMI device 25 are connected to the automatic parking ECU 10.

The target parking position determination unit 11 determines the target parking position based on the peripheral environment which is recognized by the periphery recognition sensor 3. As an example, the target parking position determination unit 11 prepares a grid map of the periphery of the host vehicle V. Further, the target parking position determination unit 11 recognizes and determines a prescribed position in the parking space, which is available for parking, in the periphery of the host vehicle V as the target parking position based on parking section lines, tire stops, or the like on the grid map. The target parking position determination unit 11 may determine the target parking position by presenting candidates of the target parking position that is the parking space, which is available for parking, and causing the driver to select one of the candidates using, for example, the HMI device 25.

The obstacle detection unit 12 detects at least the position of an obstacle which is present in the vicinity of the host vehicle V based on the peripheral environment which is recognized by the periphery recognition sensor 3. The acceleration recognition unit 13 recognizes the accelerator operation based on a signal which is detected by the acceleration pedal sensor 6, and recognizes acceleration which is requested for the host vehicle V by the driver (hereinafter, referred to as "driver-requested acceleration"). The deceleration recognition unit 14 recognizes a brake operation based on a signal which is detected by the brake pedal sensor 5, and recognizes deceleration which is requested for the host vehicle V by the driver (hereinafter, referred to as "driver-requested deceleration").

The host vehicle position acquisition unit 15 acquires the current position of the host vehicle V. The host vehicle position acquisition unit 15 can acquire the current vehicle position of the host vehicle V by calculating the movement distance and the movement direction of the host vehicle V from a reference point based on, for example, detected signals from the wheel speed sensor 4 and the yaw rate sensor 7. Meanwhile, the host vehicle position acquisition unit 15 may acquire the vehicle position by determining the position of the host vehicle V using, for example, GPS.

The route generation unit 16 generates a traveling route through which the host vehicle V passes when the parking support control is performed on the parking support device 1. The traveling route is a route from the current position of the host vehicle V to the target parking position. Plural traveling routes may be generated. The traveling route may include one or more stop positions in addition to the target parking position. In the example illustrated in FIG. 2, a traveling route L includes a wheel-turning traveling route L1 and a final traveling route L2. A stop position P includes a wheel-turning position P1 of the wheel-turning traveling route L1 and the target parking position P0 of the final traveling route L2. The current position V1 of the host vehicle V is a position at which the parking support control is started by the parking support control unit 19.

The wheel-turning traveling route L1 is a route from the current position V1 of the host vehicle V to the wheel-turning position P1. The final traveling route L2 is a route from the wheel-turning position P1 to the target parking position P0. The wheel-turning position P1 is determined based on a clearance from an obstacle. The wheel-turning position P1 is, for example, a temporary stop position which is separated from an obstacle detected by the obstacle detection unit 12 by a prescribed clearance. In other words, a position, at which the distance between the temporarily stopped host vehicle V and the obstacle is the prescribed clearance, is the wheel-turning position P1. Meanwhile, the wheel-turning position P1 is not limited to the above-described positions and can be set using well-known methods.

Meanwhile, when it is not necessary to turn wheels, the traveling route L does not include the wheel-turning traveling route L1. In this case, for example, the wheel-turning position P1, which is the start point of the final traveling route L2 illustrated in FIG. 2, corresponds to the current position of the host vehicle V which is the start position of the parking support control. In addition, when it is necessary to turn the wheels plural times, the traveling route L includes plural wheel-turning traveling routes L1. In this case, a route from the final wheel-turning position P1 of the wheel-turning traveling route L1 to the target parking position P0 illustrated in FIG. 2 corresponds to the final traveling route L2. In the route generation unit 16, the traveling route L is generated using a well-known calculating method when the parking support control is started by the parking support control unit 19 based on the target parking position P0 which is determined by the target parking position determination unit 11, the position of the obstacle which is detected by the obstacle detection unit 12, and the current position of the host vehicle V which is acquired by the host vehicle position acquisition unit 15.

Figure 3:
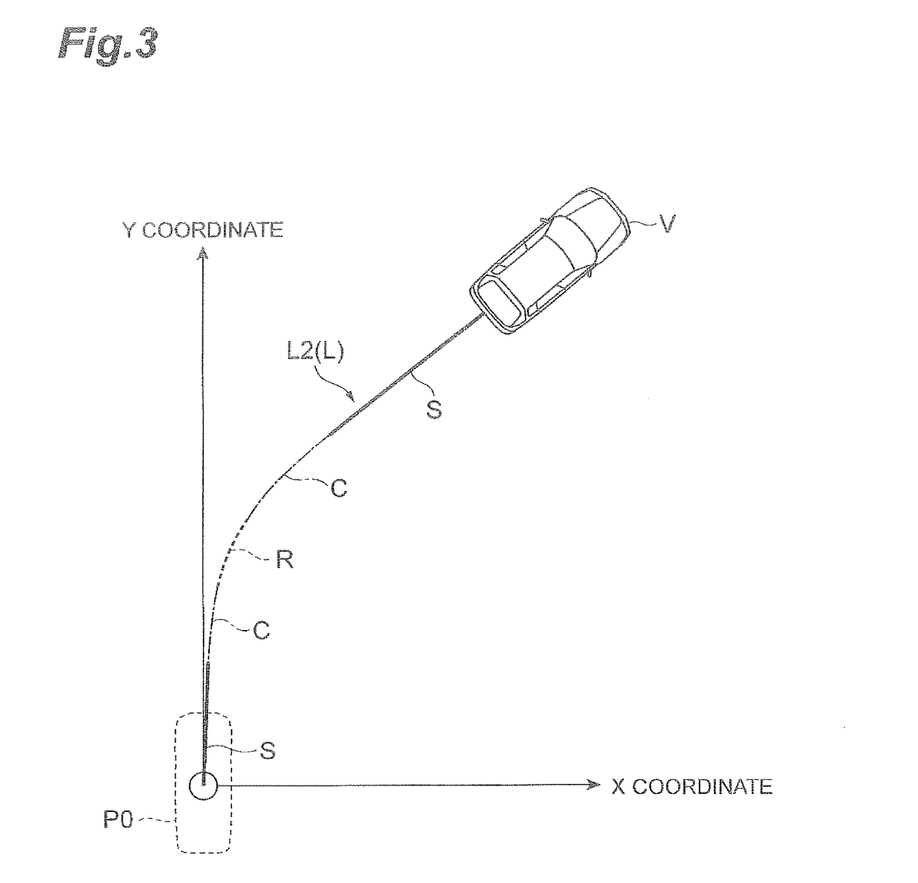
FIG. 3 is a schematic diagram illustrating the generation of a traveling route in the parking support device of FIG. 1.

FIG. 3 is a schematic diagram illustrating the generation of the traveling route in the parking support device of FIG. 1. In FIG. 3, the schematic diagram, which has a bird's-eye view of the target parking position P0 and the current position of the host vehicle V, is illustrated based on an XY coordinate system. In FIG. 3, the coordinate of the host vehicle V in the forward and backward directions after the host vehicle V stops in the target parking position P0 is set to a Y coordinate, and the coordinate of the host vehicle V in the vehicle width direction after the host vehicle V stops in the target parking position P0 is set to an X coordinate. As illustrated in FIG. 3, it is possible to acquire a traveling route L by calculating a route which is connected through a combination of a straight road S, a clothoid curved road C, and a constant curve R based on, for example, the relationship between the current position of the host vehicle V and the target parking position P0.

As illustrated in FIGS. 1 and 2, the calculation unit 17 calculates a speed pattern and a steering angle pattern which cause the host vehicle V to travel along the traveling route L generated by the route generation unit 16. The speed pattern and the steering angle pattern correspond to the traveling plan of the parking support control which is performed by the parking support control unit 19. The speed pattern and the steering angle pattern are calculated such that traveling starts from the current position V1 of the host vehicle V and stops in the target parking position P0. The speed pattern is, for example, data which is acquired by associating the position of the host vehicle V on the traveling route L with a traveling speed, and indicates transition of a traveling speed when the host vehicle V travels on the traveling route L. The steering angle pattern is, for example, data which is acquired by associating the position of the host vehicle V on the traveling route L with a steering angle, and indicates transition of a steering angle when the host vehicle V travels on the traveling route L. The speed pattern includes the wheel-turning speed pattern which causes the host vehicle V to travel along the wheel-turning traveling route L1. That is, the calculation unit 17 calculates the wheel-turning speed pattern as a part of the speed pattern. In the calculation unit 17, the speed pattern and the steering angle pattern are calculated using a well-known calculating method.

Figure 4:
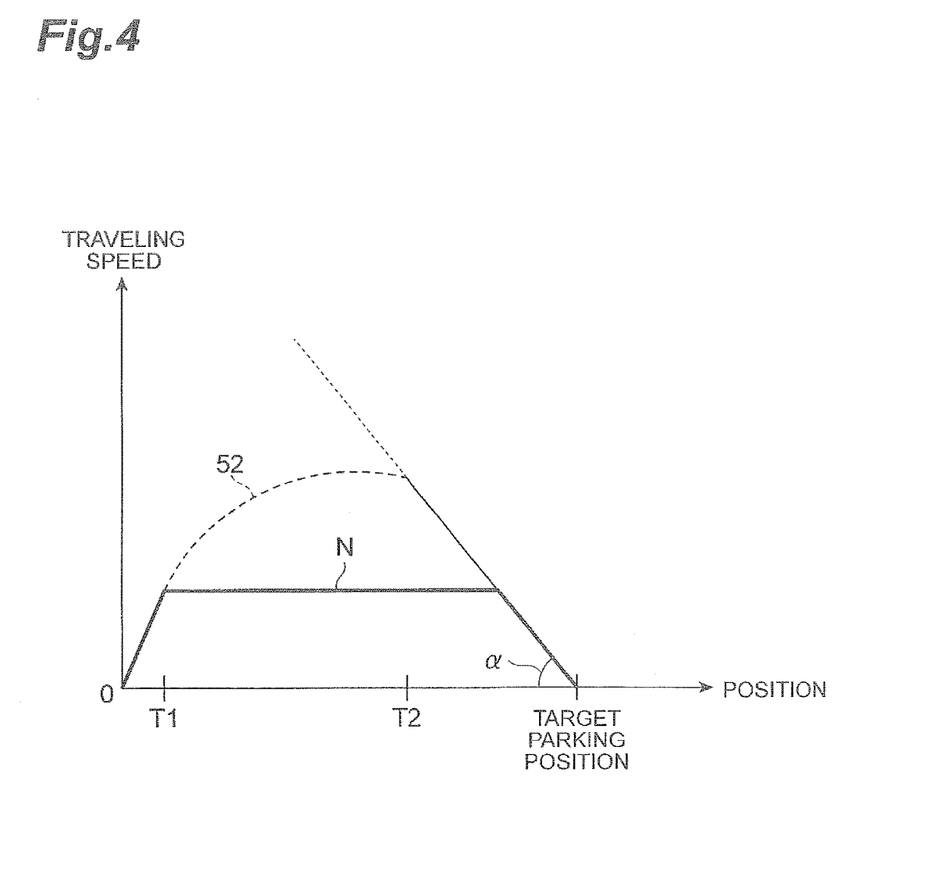
FIG. 4 is a graph illustrating an example of a speed pattern which is calculated by the calculation unit of the parking support device of FIG. 1.
Figure 5:
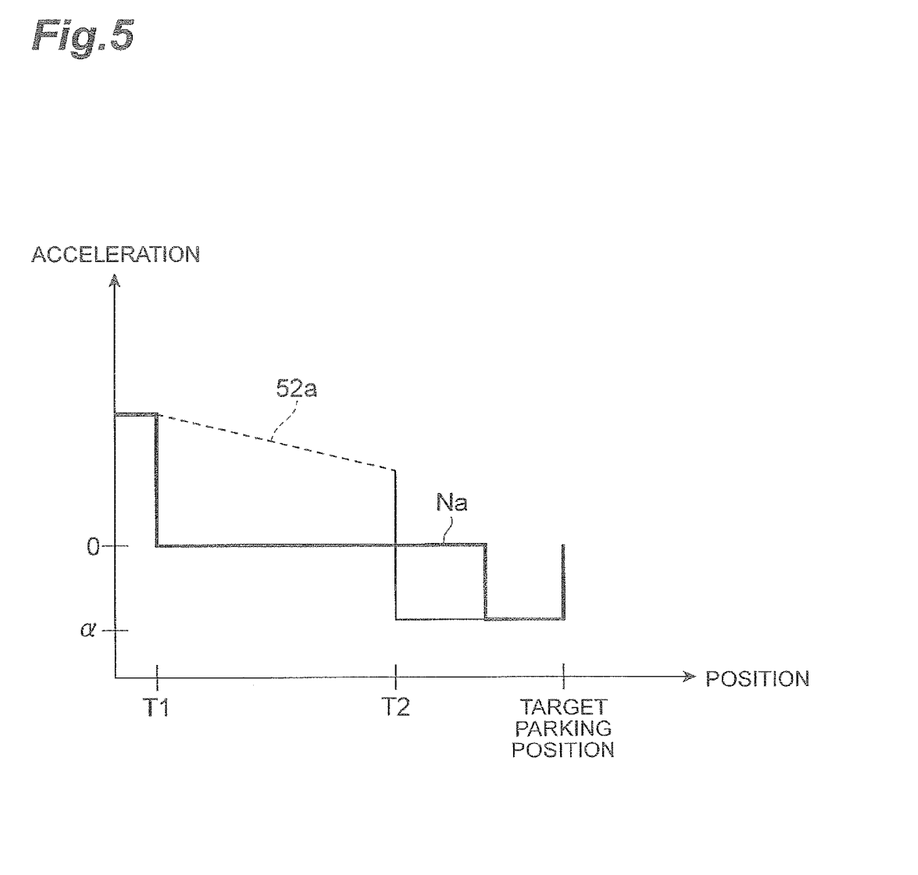
FIG. 5 is a graph illustrating the acceleration of the speed pattern of FIG. 4.

FIG. 4 is a graph illustrating an example of the speed pattern which is calculated by the calculation unit of the parking support device of FIG. 1. FIG. 5 is a graph illustrating the acceleration of the speed pattern of FIG. 4. FIGS. 4 and 5 illustrate a part corresponding to the final traveling route L2 of a speed pattern N. The horizontal axes of FIGS. 4 and 5 indicate a position on the final traveling route L2 based on the wheel-turning position P1 (refer to FIG. 2). The vertical axis of FIG. 4 indicates the traveling speed of the host vehicle V. The vertical axis of FIG. 5 indicates the acceleration of the host vehicle V. For example, as illustrated in FIGS. 4 and 5, the calculation unit 17 calculates the speed pattern N in which the host vehicle V accelerates at constant acceleration from the wheel-turning position P1, travels at a constant speed, decelerates at a set deceleration $\alpha$ which will be described later, and stops in the target parking position P0 (refer to FIG. 2).

Meanwhile, the speed pattern N is not limited to the above-described aspect. If the host vehicle V is caused to travel along the traveling route L, various patterns may be used. For example, the speed pattern N and the wheel-turning speed pattern may include an acceleration part at which the traveling speed increases linearly or non-linearly, a constant speed part at which the traveling speed is constant, and a deceleration part at which the traveling speed decreases linearly or non-linearly. In addition, it is not always necessary to include the constant speed part. Deceleration in a range in which the traveling speed decreases may be a set deceleration $\alpha$ which will be described later or a set wheel-turning deceleration.

When returning to FIGS. 1 and 2, the determination unit 18 determines whether or not the host vehicle V which is travelling on the final traveling route L2 can stop in the target parking position P0 at the set deceleration $\alpha$ based on the traveling speed of the host vehicle V, which is detected by the wheel speed sensor 4, and the position of the host vehicle V which is acquired by the host vehicle position acquisition unit 15. In addition, the determination unit 18 determines whether or not the host vehicle V which is travelling on the wheel-turning traveling route L1 can stop in the wheel-turning position P1 at the set wheel-turning deceleration based on the traveling speed of the host vehicle V, which is detected by the wheel speed sensor 4, and the position of the host vehicle V which is acquired by the host vehicle position acquisition unit 15.

The set deceleration $\alpha$ is deceleration which is set in advance in order to stop the host vehicle V in the target parking position P0. The set wheel-turning deceleration is deceleration which is set in advance in order to stop the host vehicle V in the wheel-turning position P1. The set deceleration $\alpha$ and the set wheel-turning deceleration are acquired according to, for example, the performance or specification of the host vehicle V, the width of the target parking position P0, or various requests. The set deceleration $\alpha$ and the set wheel-turning deceleration are stored in the automatic parking ECU 10 in advance. Here, the set deceleration $\alpha$ and the set wheel-turning deceleration are set to the deceleration of the speed pattern N.

Meanwhile, both the set deceleration $\alpha$ and the set wheel-turning deceleration may have the same value, the set deceleration $\alpha$ may have a greater value than the set wheel-turning deceleration, or the set deceleration $\alpha$ may have a smaller value than the set wheel-turning deceleration. The set deceleration $\alpha$ and the set wheel-turning deceleration may be set through input performed by the driver and stored in the automatic parking ECU 10. The set deceleration $\alpha$ and the set wheel-turning deceleration may have constant values or variables which are acquired using a well-known calculating method.

For example, the determination unit 18 calculates a limit position in which the host vehicle V can stop in the target parking position P0 through deceleration at the set deceleration $\alpha$ on the final traveling route L2. The determination unit 18 can determine whether or not the host vehicle V can stop in the target parking position P0 at the set deceleration $\alpha$ based on whether or not the host vehicle V reaches the limit position. In the same manner, the determination unit 18 calculates a limit position in which the host vehicle V can stop in the wheel-turning position P1 through deceleration at the set wheel-turning deceleration on the wheel-turning traveling route L1. The determination unit 18 can determine whether or not the host vehicle V can stop in the wheel-turning position P1 at the set wheel-turning deceleration based on whether or not the host vehicle V reaches the limit position. The limit position varies according to the traveling speed of the host vehicle V. The limit position varies such that the limit position is positioned on the front side of the traveling route L as, for example, the traveling speed increases.

Otherwise, the determination unit 18 calculates a stop position when the host vehicle V stops through deceleration at the set deceleration $\alpha$. The determination unit 18 can determine whether or not the host vehicle V can stop in the target parking position P0 at the set deceleration $\alpha$ based on whether or not the stop position reaches the target parking position P0. In the same manner, the determination unit 18 calculates a stop position when the host vehicle V stops through deceleration at the set wheel-turning deceleration. The determination unit 18 can determine whether or not the host vehicle V can stop in the wheel-turning position P1 at the set wheel-turning deceleration based on whether or not the stop position reaches the wheel-turning position P1.

Otherwise, the determination unit 18 calculates a braking distance on the final traveling route L2 until the host vehicle V stops through deceleration at the set deceleration $\alpha$. The determination unit 18 can determine whether or not the host vehicle V can stop in the target parking position P0 at the set deceleration $\alpha$ based on whether or not the braking distance exceeds a distance on the final traveling route L2 from the host vehicle V to the target parking position P0. In the same manner, the determination unit 18 calculates a braking distance on the wheel-turning traveling route L1 until the host vehicle V stops through deceleration at the set wheel-turning deceleration. The determination unit 18 can determine whether or not the host vehicle V can stop in the wheel-turning position P1 at the set wheel-turning deceleration based on whether or not the braking distance exceeds a distance on the wheel-turning traveling route L1 from the host vehicle V to the wheel-turning position P1.

The parking support control unit 19 outputs a shift control signal to the SBW-ECU 21, outputs a steering force control signal to the EPS-ECU 22, outputs a driving force control signal to the power management ECU 23, and outputs a braking force control signal to the brake ECU 24. Therefore, the parking support control unit 19 controls the operation of each of the devices of the host vehicle V such that the vehicle V is automatically parked in the target parking position P0 along the traveling route L. In particular, the parking support control unit 19 according to the embodiment performs the parking support control of the parking support of the host vehicle V in the target parking position P0 along the traveling route L based on the speed pattern N which is calculated by the calculation unit 17.

In addition, when the driver-requested acceleration is recognized by the acceleration recognition unit 13 during the parking support control and the driver-requested acceleration exceeds the acceleration of the speed pattern N at the time of recognition, the parking support control unit 19 accelerates the host vehicle V at the driver-requested acceleration. When the determination unit 18 determines that the host vehicle V has become able to stop in the target parking position P0 at the set deceleration $\alpha$, the parking support control unit 19 decelerates the host vehicle V at the set deceleration $\alpha$ regardless of the driver-requested acceleration.

In the examples illustrated in FIGS. 4 and 5, when the position of the host vehicle V is a position T1 during the parking support control along the final traveling route L2 in the speed pattern N, the acceleration pedal is stepped on by the driver, and a driver-requested acceleration 52*a* is recognized by the acceleration recognition unit 13. At the time of recognition, the acceleration Na of the speed pattern N becomes 0. However, because the driver-requested acceleration 52*a* exceeds the acceleration Na, the host vehicle V is accelerated at the driver-requested acceleration 52*a* by the parking support control unit 19, and the host vehicle V travels at the traveling speed having a pattern 52.

Further, when the traveling progresses and the host vehicle V reaches, for example, a position T2 at which a straight line having an angle corresponding to the set deceleration $\alpha$ crosses the pattern 52 in the graph of FIG. 4, the determination unit 18 determines that the host vehicle V has become able to stop in the target parking position P0 at the set deceleration $\alpha$, with the result that the parking support control unit 19 decelerates the host vehicle V at the set deceleration $\alpha$, and thus the host vehicle stops in the target parking position P0.

In addition, as illustrated in FIGS. 1 and 2, when the driver-requested acceleration is recognized by the acceleration recognition unit 13 during the parking support control and the driver-requested acceleration exceeds the acceleration of the wheel-turning speed pattern at the time of recognition, the parking support control unit 19 accelerates the host vehicle V at the driver-requested acceleration. When the determination unit 18 determines that the host vehicle V can stop in the wheel-turning position P1 at the set wheel-turning deceleration, the parking support control unit 19 decelerates the host vehicle V at the set wheel-turning deceleration regardless of the driver-requested acceleration.

In addition, when the driver-requested deceleration is recognized by the deceleration recognition unit 14 during the parking support control, the parking support control unit 19 compares the driver-requested deceleration with the deceleration of the speed pattern N which is calculated by the calculation unit 17. The parking support control unit 19 decelerates the host vehicle V at either the deceleration which has a greater value.

In addition, when the driver-requested deceleration is recognized by the deceleration recognition unit 14 during the parking support control and the host vehicle V is decelerated at the driver-requested deceleration and stops, the parking support control unit 19 executes functions below based on the signals which are detected by the respective sensors 3 to 7. That is, when the driver-requested deceleration is equal to or greater than constant deceleration, the parking support control unit 19 determines that the brake operation corresponds to emergency braking and cancels the parking support control. When it is determined that the host vehicle V stops in the target parking position P0, the parking support control unit 19 completes the parking support control of the parking support being finished. When the duration time of the brake operation (hereinafter, referred to as "brake duration time") is equal to or longer than constant time, the parking support control unit 19 cancels the parking support control.

The SBW-ECU 21 is an electronic control unit which controls the shift range of an automatic transmission. The SBW-ECU 21 usually detects the shift range, which is the position of the shift lever of the host vehicle V, as an electrical signal. The SBW-ECU 21 sets the shift range of the host vehicle V by transmitting the detected electrical signal to a shift gear through a signal line. In addition, when the SBW-ECU 21 receives the shift control signal from the automatic parking ECU 10, the SBW-ECU 21 switches the shift of the host vehicle V according to the shift range indicated by the shift control signal.

The EPS-ECU 22 is an electronic control unit which controls steering force to be added to a steering mechanism. The EPS-ECU 22 usually sets a target steering force according to a steering operation by the driver. The EPS-ECU 22 controls a steering actuator such that the target steering force is generated. In addition, when the EPS-ECU 22 receives the steering force control signal from the automatic parking ECU 10, the EPS-ECU 22 controls the steering actuator such that the steering operation is performed at the steering angle indicated by the steering force control signal.

The power management ECU 23 is an electronic control unit which controls a driving force generated in a driving source. The driving source includes, for example, driving source with only an engine, driving source with only a motor, and hybrid driving source with the engine and the motor. The power management ECU 23 usually sets a target driving force according to the amount of operation performed by the acceleration pedal, which is detected by the acceleration pedal sensor 6. The power management ECU 23 controls the actuator (not shown in the drawing) according to the form of the driving source such that the target driving force is generated. In addition, when the power management ECU 23 receives the driving force control signal from the automatic parking ECU 10, the power management ECU 23 controls the actuator such that the host vehicle V travels at the traveling speed indicated by the driving force control signal.

The brake ECU 24 is an electronic control unit which controls the braking force of the host vehicle V. The brake ECU 24 usually sets a target braking force according to the amount of operation performed by the brake pedal, which is detected by the brake pedal sensor 5. The brake ECU 24 controls a brake actuator (not shown in the drawing) of each wheel such that the target braking force is generated. In addition, when the brake ECU 24 receives the braking force control signal from the automatic parking ECU 10, the brake ECU 24 controls the brake actuator of each wheel such that the target braking force, which is indicated by the braking force control signal, is generated.

The HMI device 25 is used when, for example, the target parking position P0, which is determined by the target parking position determination unit 11, is notified to the driver. The HMI device 25 includes sound output means such as a speaker, and a display device such as a Head Up Display (HUD), the display of a navigation system, the combination meter or the like.

Subsequently, an example of parking support control, which is realized by the parking support device 1 according to the embodiment, will be described with reference to FIG. 2. In the description here, the parking support control in which wheels are turned once when the vehicle moves backward to park is shown as an example.

As illustrated in FIG. 2, for example, the host vehicle V is traveling at the current position V1 while the traveling speed is equal to or slower than a prescribed speed (equal to or slower than 30 km/h). When the activation switch 2 of the host vehicle V is turned ON by the driver, detection of the periphery recognition sensor 3 starts, and thus the peripheral environment of the host vehicle V is recognized. Subsequently, the target parking position P0 is determined by the target parking position determination unit 11 of the automatic parking ECU 10 based on the information relevant to the peripheral environment which is acquired from the periphery recognition sensor 3. The target parking position P0 is notified to the driver by the HMI device 25. Further, the parking support control below is started by the automatic parking ECU 10.

That is, an obstacle 60 is detected by the obstacle detection unit 12 based on the peripheral environment which is acquired from the periphery recognition sensor 3. Information about the current position V1 of the host vehicle V is acquired by the host vehicle position acquisition unit 15 based on, for example, the signals which are detected by the wheel speed sensor 4 and the yaw rate sensor 7. The wheel-turning traveling route L1 from the current position V1 of the host vehicle V to the wheel-turning position P1 and the final traveling route L2 from the wheel-turning position P1 to the target parking position P0 are generated as the traveling route L by the route generation unit 16. Here, the route generation unit 16 sets a position, which is separated from the obstacle 60 detected by the obstacle detection unit 12 by a prescribed clearance CL, to the wheel-turning position P1.

Subsequently, the speed pattern N, which causes the host vehicle V to travel along the traveling route L generated by the route generation unit 16, and the steering angle pattern are calculated by the calculation unit 17. The control signals according to the speed pattern N and the steering angle pattern, which are calculated by the calculation unit 17, are output to the respective ECUs 21 to 24 by the parking support control unit 19. The parking support control of the host vehicle V is performed by the respective ECUs 21 to 24 based on the speed pattern N and the steering angle pattern. For example, shift control performed by the SBW-ECU 21, steering force control performed by the EPS-ECU 22, driving force control performed by the power management ECU 23, and braking force control performed by the brake ECU 24 are performed in a coordinated manner such that the host vehicle V automatically travels along the traveling route L. Further, the automatic parking of the host vehicle V in the target parking position P0 is completed.

Figure 6:
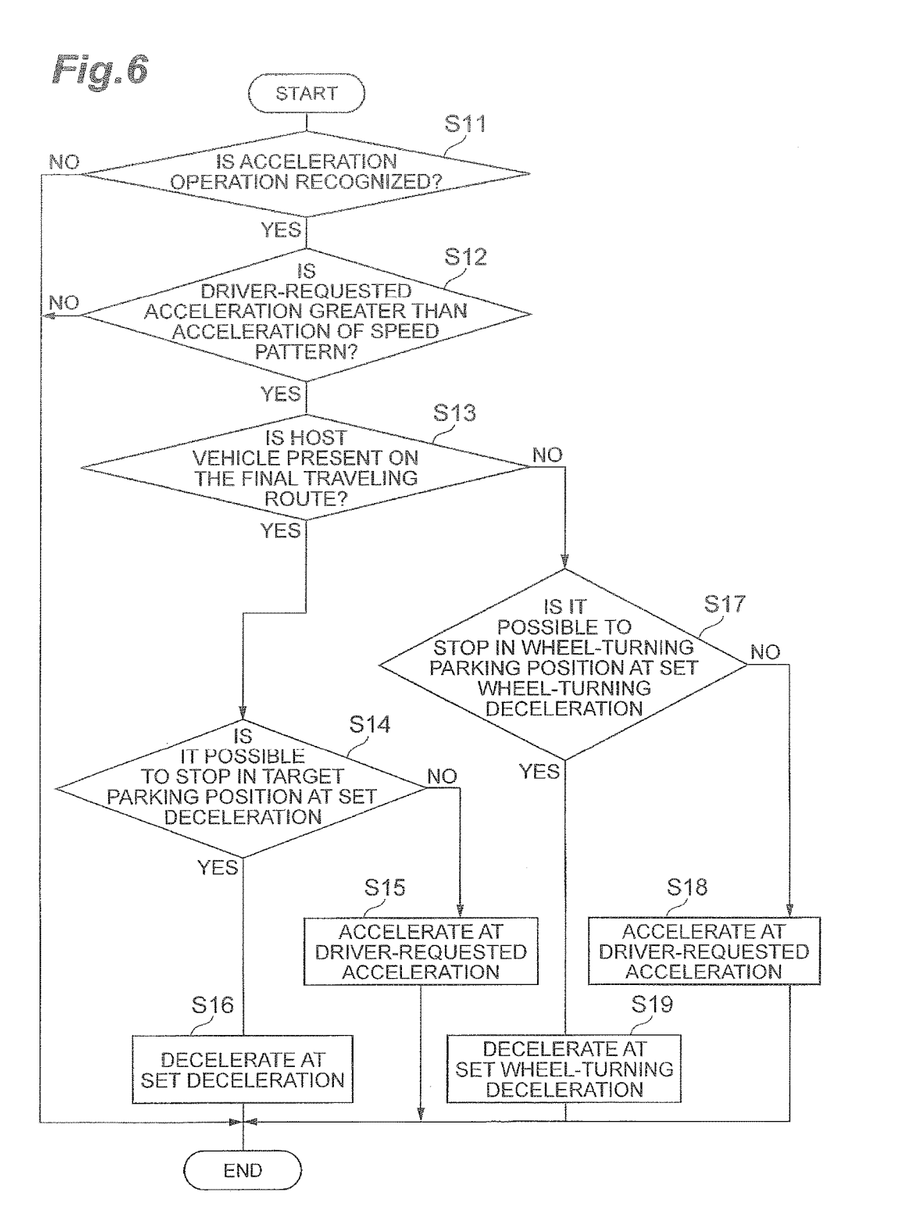
FIG. 6 is a flowchart illustrating a process performed by a parking support control unit in the parking support device of FIG. 1.
Figure 7:
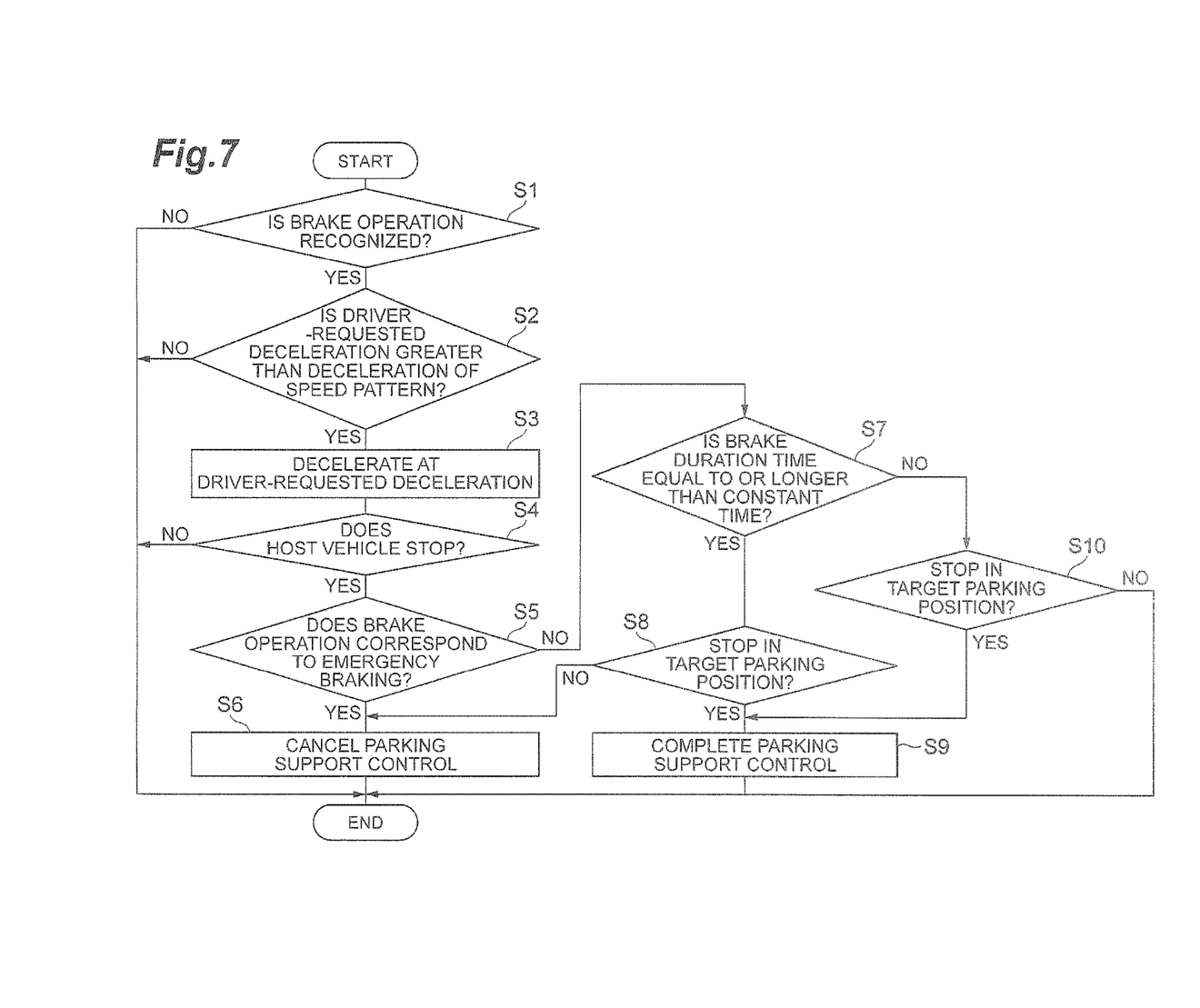
FIG. 7 is another flowchart illustrating the process performed by the parking support control unit in the parking support device of FIG. 1.

Subsequently, the above-described process performed by the parking support control unit 19 will be described in detail with reference to flowcharts of FIGS. 6 and 7.

When the parking support control is performed, the parking support control unit 19 repeatedly performs a series of processes below relevant to an accelerator operation illustrated in FIG. 6 in a prescribed processing period. As illustrated in FIG. 6, first, the parking support control unit 19 determines whether or not the accelerator operation is recognized by the acceleration recognition unit 13 (S11). When the accelerator operation is recognized, the parking support control unit 19 recognizes the driver-requested acceleration due to the accelerator operation. Thereafter, the parking support control unit 19 determines whether or not the recognized driver-requested acceleration exceeds acceleration of the speed pattern N, which is calculated by the calculation unit 17, at the time of recognition of the driver-requested acceleration (S12). Meanwhile, when the accelerator operation is not recognized, the parking support control unit 19 terminates the series of processes.

When the driver-requested acceleration exceeds the acceleration of the speed pattern N at the time of recognition of the driver-requested acceleration, the parking support control unit 19 determines whether or not the host vehicle V is present on the final traveling route L2 based on the vehicle position of the host vehicle V which is acquired by the host vehicle position acquisition unit 15 (S13). When the host vehicle V is present on the final traveling route L2, the determination unit 18 determines whether or not it is possible to stop in the target parking position P0 at the set deceleration α (S14).

When it is not possible to stop in the target parking position P0 at the set deceleration α, the parking support control unit 19 outputs a driving force control signal relevant to the driver-requested acceleration to the power management ECU 23, and accelerates the host vehicle V at the driver-requested acceleration (S15). In other words, the parking support control unit 19 permits acceleration due to the accelerator operation, realizes the driver-requested acceleration, and performs traveling at a traveling speed which exceeds the speed pattern N as shown in, for example, the pattern 52 of FIG. 4. Meanwhile, when it is possible to stop in the target parking position P0 at the set deceleration α, the parking support control unit 19 outputs a braking force control signal relevant to the set deceleration α to the brake ECU 24, decelerates the host vehicle V at the set deceleration α, and stops the host vehicle V in the target parking position P0 (S16).

On the other hand, when the host vehicle V is not present on the final traveling route L2 (NO in step S13), it is determined that the host vehicle V is present on the wheel-turning traveling route L1, and thus the determination unit 18 determines whether or not it is possible to stop in the wheel-turning position P1 at the set wheel-turning deceleration (S17). When it is not possible to stop in the wheel-turning position P1 at the set wheel-turning deceleration, the parking support control unit 19 outputs a driving force control signal relevant to the driver-requested acceleration to the power management ECU 23, and accelerates the host vehicle V at the driver-requested acceleration (S18). Meanwhile, when it is possible to stop in the wheel-turning position P1 at the set wheel-turning deceleration, the parking support control unit 19 outputs a braking force control signal relevant to the set wheel-turning deceleration to the brake ECU 24, decelerates the host vehicle V at the set wheel-turning, and stops the host vehicle V in the wheel-turning position P1 (S19).

In addition, when the parking support control is performed, the parking support control unit 19 repeatedly performs a series of processes below relevant to the brake operation illustrated in FIG. 7 in a prescribed processing period. As illustrated in FIG. 7, first, it is determined whether or not the brake operation is recognized by the deceleration recognition unit 14 (S1). When the brake operation is recognized, the parking support control unit 19 recognizes the driver-requested deceleration due to the brake operation. Thereafter, the parking support control unit 19 determines whether or not the recognized driver-requested deceleration is greater than the deceleration of the speed pattern N calculated by the calculation unit 17 at the time of recognition of the driver-requested deceleration (S2). Meanwhile, when the driver-requested deceleration is not recognized, the parking support control unit 19 terminates the series of processes.

When the driver-requested deceleration is greater than the deceleration of the speed pattern N at the time of recognition of the driver-requested deceleration, the parking support control unit 19 outputs a braking force control signal relevant to the driver-requested deceleration to the brake ECU 24, and decelerates the host vehicle V at the driver-requested deceleration (S3). Meanwhile, when the driver-requested deceleration is equal to or less than the deceleration of the speed pattern N, the parking support control unit 19 terminates the series of processes.

Subsequently, the parking support control unit 19 determines whether or not the host vehicle V stops based on the signal detected from the wheel speed sensor 4 (S4). When the host vehicle V does not stop, the parking support control unit 19 terminates the series of processes. Meanwhile, when the host vehicle V stops, the parking support control unit 19 determines whether or not the driver-requested deceleration recognized in step S1 is equal to or greater than constant deceleration, and determines whether or not the brake operation corresponds to the emergency braking (S5).

When the brake operation corresponds to the emergency braking, the parking support control unit 19 cancels the parking support control. That is, the parking support control transitions to an operation performed by the driver (S6). In contrast, when the brake operation does not correspond to the emergency braking, the parking support control unit 19 determines whether or not the driver-requested deceleration is continuously detected for a time which is equal to or longer than a constant time, and determines whether or not the brake duration time is equal to or longer than a constant time (S7). When the brake duration time is equal to or longer than the constant time, the parking support control unit 19 determines whether or not the host vehicle V stops in the target parking position P0 based on the vehicle position of the host vehicle V acquired by the host vehicle position acquisition unit 15 (S8).

When the host vehicle V does not stop in the target parking position P0, the parking support control unit 19 proceeds to step S6 in which the parking support control is cancelled. In contrast, when the host vehicle V stops in the target parking position P0, it is assumed that parking in the target parking position P0 is completed, and thus the parking support control unit 19 shifts the shift range to a parking range using the SBW-ECU 21 and completes the parking support control (S9).

When the brake duration time is not equal to or longer than the constant time (NO in step S7), the parking support control unit 19 determines whether or not the host vehicle V stops in the target parking position P0 (S10) similarly to step S8. When the host vehicle V stops in the target parking position P0, it is assumed that the parking in the target parking position P0 is completed, and thus the parking support control unit 19 proceeds to step S9 in which the parking support control is terminated. In contrast, when the host vehicle V does not stop in the target parking position P0, the parking support control unit 19 terminates the series of processes.

Hereinabove, in the parking support device 1 according to the embodiment, when the driver-requested acceleration is recognized by the acceleration recognition unit 13 during the parking support control and when the acceleration of the speed pattern N exceeds the driver-requested acceleration at the time of recognition, the host vehicle V is accelerated at the driver-requested acceleration by the parking support control unit 19. When it is determined that the host vehicle V can stop in the target parking position P0 at the set deceleration α, the parking support device 1 decelerates the host vehicle V at the set deceleration α using the parking support control unit 19 regardless of the driver-requested acceleration. Therefore, according to the parking support device 1, it is possible to reflect the accelerator operation performed by the driver in the parking support control. As a result, for example, a driver who feels that a traveling speed based on the parking support control is slow can accelerate the host vehicle V by performing the accelerator operation until it is determined that the host vehicle V can stop in the target parking position P0 at the set deceleration α, and thus it is possible to reduce a control time until the parking is completed.

In the parking support device 1 according to the embodiment, the traveling route L includes the wheel-turning traveling route L1, and the calculation unit 17 calculates the wheel-turning speed pattern as a part of the speed pattern N. The determination unit 18 determines whether or not the host vehicle can stop in the wheel-turning position P1 at the set wheel-turning deceleration based on the traveling speed and the position of the host vehicle V. Further, when the driver-requested acceleration is recognized by the acceleration recognition unit 13 during the parking support control and the driver-requested acceleration exceeds the acceleration of the wheel-turning speed pattern at the time of recognition, the parking support control unit 19 accelerates the host vehicle at the driver-requested acceleration. When it is determined that the host vehicle V can stop in the wheel-turning position P1 at the set wheel-turning deceleration, the parking support control unit 19 decelerates the host vehicle V at the set wheel-turning deceleration regardless of the requested acceleration. As described above, according to the parking support device 1, it is possible to perform the parking support control along the traveling route L which includes the wheel-turning traveling route L1. It is possible to perform the parking support control in accordance with the peripheral environment in the target parking position P0.

In the parking support device 1 according to the embodiment, when the driver-requested deceleration is detected during the parking support control, system-requested deceleration is compared with the driver-requested deceleration, and thus deceleration is realized through deceleration on the side of greater requested deceleration. That is, the parking support device 1 reflects only the driver-requested deceleration, which corresponds to a request greater than the system-requested deceleration, in the parking support control. Therefore, the driver who feels that the traveling speed of the parking support control is too fast can adjust the traveling speed by performing the brake operation. Accordingly, according to the parking support device 1, it is possible to reflect the brake operation performed by the driver in the parking support control, thereby improving convenience.

In addition, in a technology relevant to the parking support device 1, control is performed such that a constant speed is maintained during the parking support control. Therefore, when a driver operates a brake with the intention of performing the parking support control through deceleration, there is a possibility that the operational intention of the driver is not reflected. Here, when the driver-requested deceleration is greater than the system-requested deceleration during the parking support control, the parking support device 1 realizes deceleration through the driver-requested deceleration (refer to FIG. 7). Therefore, it is possible to reflect the intention of the driver in the parking support control.

When the host vehicle decelerates at the driver-requested deceleration and stops during the parking support control and it is determined that the brake operation corresponds to emergency braking, the parking support device 1 according to the embodiment cancels the parking support control. In addition, when the vehicle decelerates at the driver-requested deceleration and stops during the parking support control and when it is determined that the host vehicle V stops in the target parking position P0, the parking support device 1 completes the parking support control. In addition, when the host vehicle decelerates at the driver-requested deceleration and stops at the driver-requested deceleration during the parking support control and when the brake duration time is equal to or longer than a constant time, the parking support device 1 cancels the parking support control. As described above, when the driver has an intention of cancelling or terminating the parking support control, it is possible to reflect the intention due to the brake operation including vehicle stopping, thereby improving convenience.

Hereinbefore, although the embodiment of the present invention has been described, the present invention is not limited to the embodiment and may be implemented in various forms. In the embodiment, the automatic parking ECU 10 which includes the target parking position determination unit 11, the obstacle detection unit 12, the acceleration recognition unit 13, the deceleration recognition unit 14, the host vehicle position acquisition unit 15, the route generation unit 16, the calculation unit 17, the determination unit 18 and the parking support control unit 19, is mounted on the host vehicle V. However, for example, when road-to-vehicle communication or the like is used, at least one of the units may be mounted on an external device other than the host vehicle V. For example, the target parking position determination unit 11 and the route generation unit 16 may be provided in a parking vehicle management device which is provided in the parking lot.

In the embodiment, the parking support control, in which wheels are turned once when the host vehicle V moves backward to park, is shown as an example. However, it is possible to apply the present invention in the same manner to, for example, parking support control in which wheels are not turned when the host vehicle moves backward or forward to park, that is, parking support control along the traveling route having only the final traveling route. In this case, the parking support control unit 19 repeatedly performs, for example, a series of processes which do not include steps S13 and S17 to S19 of the flowchart illustrated in FIG. 6 in a prescribed processing period.

In the embodiment, it is possible to apply the present invention in the same manner to parking support control in which wheels are turned two or more times when the vehicle moves backward to park, parking support control in which wheels are not turned when the vehicle moves forward to park, and parking support control in which wheels are turned one or more times when the vehicle moves forward to park. Meanwhile, the determination and designation of a parking form may be automatically performed based on a result of detection by the periphery recognition sensor 3, and a driver may manually select the parking form by suggesting the parking form to the driver using, for example, the HMI device 25.

In the embodiment, the parking support control in which the host vehicle V is parked in the parking lot is shown as an example. However, it is possible to apply the present invention to parking support control in which the host vehicle V is parked, for example, when the host vehicle is parked in a garage. In the embodiment, the parking support control unit 19 may perform only the parking support control along the final traveling route L2. In this case, the final traveling route L2 is generated while it is assumed that the wheel-turning position P1 is the current position of the host vehicle V.

What is claimed is:

1. A parking support device comprising:
   a calculation unit configured to calculate a speed pattern which causes a vehicle to travel along a traveling route from a current position of the vehicle to a target parking position;
   an acceleration recognition unit configured to recognize driver-requested acceleration with regard to the vehicle based on an accelerator operation performed by the driver of the vehicle; and
   a control unit configured to control parking support in the target parking position based on the speed pattern and the traveling route and to determine whether or not the driver-requested acceleration exceeds acceleration of the speed pattern,
   wherein the control unit is configured to
      accelerate the vehicle at the requested acceleration when (i) the driver-requested acceleration is recognized by the acceleration recognition unit during the control of parking support and (ii) the requested acceleration exceeds the acceleration of the speed pattern at the time of the recognition, and
      decelerate the vehicle at a set deceleration and stop the vehicle in the target parking position regardless of the requested acceleration when it is determined that the vehicle (i) is present on a predetermined final traveling route and (ii) can stop in the target parking position at the set deceleration which is set in advance, based on a traveling speed and a position of the vehicle.

2. The parking support device according to claim 1, further comprising:
   an obstacle detection unit configured to detect a position of an obstacle which is present in a vicinity of the vehicle,
   wherein the traveling route includes a wheel-turning traveling route from the current position of the vehicle to a wheel-turning position which is determined by clearance with the obstacle detected by the obstacle detection unit,
   wherein the calculation unit is configured to calculate a wheel-turning speed pattern which causes the vehicle to travel along the wheel-turning traveling route, as a part of the speed pattern, and
   wherein the control unit is configured to
      accelerate the vehicle at the requested acceleration when (i) the driver-requested acceleration is recognized by the acceleration recognition unit during the control of parking support and (ii) the requested acceleration exceeds the acceleration of the wheel-turning speed pattern at the time of the recognition, and
      decelerate the vehicle at a set wheel-turning deceleration and stop the vehicle in the wheel-turning position regardless of the requested acceleration when it is determined that the vehicle can stop in the wheel-turning position at the set wheel-turning deceleration which is set in advance, based on the traveling speed and the position of the vehicle.

* * * * *